US008503355B2

(12) United States Patent
Pichelin et al.

(10) Patent No.: US 8,503,355 B2
(45) Date of Patent: Aug. 6, 2013

(54) METHOD, SERVER, AND SYSTEM FOR MANAGING "PUSH-TO-TALK" SESSION

(75) Inventors: Aude Pichelin, Paris (FR); Nathalie Beziot, Le Plessis Robinson (FR); Khadjia Daoud-Triki, Issy les Moulineaux (FR)

(73) Assignee: France Telecom, Paris (FR)

(*) Notice: Subject to any disclaimer, the term of this patent is extended or adjusted under 35 U.S.C. 154(b) by 113 days.

(21) Appl. No.: 10/592,508

(22) PCT Filed: Mar. 16, 2005

(86) PCT No.: PCT/FR2005/000641
§ 371 (c)(1),
(2), (4) Date: Nov. 17, 2006

(87) PCT Pub. No.: WO2005/101876
PCT Pub. Date: Oct. 27, 2005

(65) Prior Publication Data
US 2007/0177602 A1  Aug. 2, 2007

(30) Foreign Application Priority Data
Mar. 17, 2004  (EP) .................................... 04290729

(51) Int. Cl.
*H04W 4/00* (2009.01)
*H04L 12/28* (2006.01)
*H04L 12/66* (2006.01)
*H04L 1/00* (2006.01)
*H04L 29/06* (2006.01)
*H04B 1/00* (2006.01)
*H04B 7/00* (2006.01)
*G06F 15/16* (2006.01)
*G06F 17/00* (2006.01)

(52) U.S. Cl.
USPC ........ 370/328; 370/395.2; 370/401; 370/352; 370/232; 370/338; 370/260; 455/72; 455/414.3; 455/518; 709/227; 700/94

(58) Field of Classification Search
USPC ...................................... 370/395.2, 401, 328
See application file for complete search history.

(56) References Cited

U.S. PATENT DOCUMENTS
5,758,256 A   5/1998 Berry et al.
2002/0077065 A1   6/2002 Tamura et al.
(Continued)

FOREIGN PATENT DOCUMENTS
EP   0 748 138 A2   12/1996
JP   A-9-36917   2/1997
(Continued)

OTHER PUBLICATIONS

Ericcson, et al. "Push-To-Talk Over Cellular (PoC); Signaling Flows; PoC Release 1.0." *Signaling Flows*, No. v113, pp. 1-115, Aug. 2003.

(Continued)

*Primary Examiner* — Patrick N. Edouard
*Assistant Examiner* — Timothy Pham
(74) *Attorney, Agent, or Firm* — Knobbe Martens Olson & Bear LLP

(57) ABSTRACT

A method, a server and a system for managing a session in walkie-talkie ("push-to-talk") mode between terminals each of which has respective capacities for encoding and decoding voice and/or image signals. The terminals are logged onto the session via a server and a first wireless telecommunications network to which the terminals are connected and a second network to which the server is connected. The server comprises a data encoder/decoder. When a session is established at the request of a terminal, a sender terminal sends data encoded according to an initial type of coding to one or more receiver terminals that are connected via the server. The server receiving data encoded according to the initial type of coding then processes the data according to the respective capacities of the receiver terminals in order to ensure compatibility of the data encoded according to the initial type of coding and the data received by the receiver terminals, where applicable according to at least one type of coding other than the initial type of coding. The server then sends the processed data to the receiver terminals.

16 Claims, 2 Drawing Sheets

U.S. PATENT DOCUMENTS

| | | | |
|---|---|---|---|
| 2002/0105917 A1 | 8/2002 | Rabipour et al. | |
| 2002/0107593 A1 | 8/2002 | Rabipour et al. | |
| 2003/0115332 A1 | 6/2003 | Honeisen | |
| 2004/0032843 A1 | 2/2004 | Schaefer et al. | |
| 2004/0058698 A1* | 3/2004 | Crockett et al. | 455/518 |
| 2004/0202117 A1* | 10/2004 | Wilson et al. | 370/310 |
| 2004/0224710 A1* | 11/2004 | Koskelainen et al. | 455/518 |
| 2005/0060411 A1* | 3/2005 | Coulombe et al. | 709/227 |
| 2005/0232232 A1* | 10/2005 | Farber et al. | 370/352 |
| 2006/0094455 A1* | 5/2006 | Hannu et al. | 455/518 |
| 2007/0281672 A1* | 12/2007 | Backstrom et al. | 455/414.3 |
| 2007/0297331 A1* | 12/2007 | Tidwell | 370/232 |

FOREIGN PATENT DOCUMENTS

| | | |
|---|---|---|
| JP | A-11-98257 | 4/1999 |
| WO | WO 01/67675 A2 | 9/2001 |
| WO | WO 01/67787 A2 | 9/2001 |
| WO | WO 2004/028113 A1 | 4/2004 |

OTHER PUBLICATIONS

Aug. 24, 2010 Office Action in Japanese Application No. 2007-503379, with translation.

* cited by examiner

METHOD, SERVER, AND SYSTEM FOR MANAGING "PUSH-TO-TALK" SESSION

The field of the present invention is that of telecommunications, more precisely that of walkie-talkie communications services using wireless telecommunications networks. These services are commonly referred to as "push-to-talk" services.

In a wireless telecommunications network, a "push-to-talk" service enables users to communicate using the well-known walkie-talkie principle. Thus a first subscriber may communicate immediately in walkie-talkie mode with one or more pre-listed users simply by pressing a button on a terminal. The other users hear the voice of the first user on their terminals without having to operate any key.

Accordingly, using the "push-to-talk" service, users of a mobile network can contact a group of persons instantaneously without even dialing a telephone number. Users can send messages simultaneously to one or more receiver terminals participating in the session. Conventionally, it suffices to select one or more parties from a list displayed on the terminal screen and to press a key to send them information. The terminal becomes a telephone transformed in this way into a walkie-talkie.

It is therefore very simple for an initiator terminal to initiate a "push-to-talk" session in which one or more terminals participate, which terminals are referred to below as 'participating terminals'. A few steps described below establish the session between the initiator terminal and the participating terminals. Only one of the terminals participating in the session is authorized to send at any given time. Authorization to send is assigned to a terminal on demand and the terminal that has been authorized to send is referred to below as the 'sender terminal'. The other terminals participating in the session receive data from the sender terminal and are referred to below as 'receiver terminals'.

As a general rule, connected receiver terminals are conventionally alerted by a beep and receive information sent by the sender terminal immediately after the beep.

The data sent in a "push-to-talk" session may be voice data, for example, or image data, in particular video data.

The simplicity and low cost of a "push-to-talk" communication enable operators to offer a very attractive and very practical service for professional users such as taxi drivers, for example. Other application areas are communication between family members or friends taking part in games and recreational activities in extensive areas such as ski slopes or theme parks.

The "push-to-talk" service is controlled by a server, usually called a "push-to-talk" server, which is involved in setting up "push-to-talk" sessions, authorizing sending, and transmitting data from the sender terminal to the receiver terminals.

Nevertheless, problems are encountered at present in managing walkie-talkie mode sessions connecting terminals via a server and at least one telecommunications network when the terminals have respective coding and decoding capacities for speech and/or picture signals.

In this context, parameters that define certain aspects of the session to be set up, in particular the type of coding to be used to send data, are negotiated with a first called terminal. Consequently, the initiator terminal uses a type of coding determined as a function of the coding and decoding capacities that it has in common with the first terminal that responded on setting up the session to code data to be transmitted. If several terminals are called to participate in a session, a second terminal may not have coding and decoding capacities enabling it to decode data sent by the initiator terminal. In this case, the second terminal cannot decode the received information.

Moreover, when a participating terminal is authorized to send, it may use a code that is incompatible with the other connected terminals.

A problem is also encountered when a new participant logs onto a established session. In this situation, the terminals already logged onto the session do not know the coding and decoding capacities of the new participating terminal. The terminals already connected may therefore use code types incompatible with the coding and decoding capacities of the new participating terminal.

The present invention improves on this situation.

A first aspect of the invention provides a method of managing a walkie-talkie ("push-to-talk") mode session between a plurality of terminals having respective data coding and decoding capacities, said session connecting the plurality of terminals via a walkie-talkie mode session management server and at least one telecommunications network, in which method, after a session has been established:

a sender terminal sends data coded using an initial coding type to a plurality of receiver terminals connected via the server;

the server receives the data coded using the initial coding type and checks the compatibility of the respective capacities of the receiver terminals with the initial coding type, and if it detects an incompatibility between the initial coding type and the capacities of at least one of the receiver terminals, the server adapts the coding of the data to a coding type compatible with the capacities of said receiver terminal before forwarding the data to it, so that said receiver terminal is able to decode the data.

A second aspect of the invention provides a service for managing a walkie-talkie ("push-to-talk") mode session, supported by at least one telecommunications network and intended to be implemented by a plurality of terminals logged onto the same session, the service consisting, in operation, in executing the steps of the method defined above.

A third aspect of the invention provides a server for managing a walkie-talkie ("push-to-talk") mode session, comprising means for implementing the method defined above.

A fourth aspect of the invention provides a system for managing a walkie-talkie ("push-to-talk") mode session, comprising means for implementing the method defined above.

A fifth aspect of the invention provides a data stream sent by a terminal to a server for managing sessions in walkie-talkie mode, said stream supporting a message defined by a particular signaling protocol and having the function of logging the terminal onto a session in walkie-talkie mode, characterized in that said message contains the coding and decoding capacities of said terminal.

By means of the above provisions, a UMTS network can offer a "push-to-talk" service that adapts to suit the capacities of the terminals.

The document U.S. 2004/0032843 describes a method of managing a "push-to-talk" session between a CDMA digital mobile terminal able to send and receive voice data coded using a given type of coding and one or more analog radio terminals that are adapted to send and receive analog radio signals and have no data coding and decoding capacities. After setting up a "push-to-talk" session between the CDMA terminal and the radio terminals, a gateway server converts coded data coming from the CDMA terminal into analog radio signals transmitted to the radio terminals and analog radio signals coming from one or more radio terminals into voice coded data sent to the CDMA mobile terminal. Digital-to-analog conversion from voice coded data to analog radio signals is effected systematically by the gateway server. All the radio receiver terminals pick up the same analog radio signals broadcast by the gateway server, which therefore does not adapt the coding of the data as a function of the specific capacities of the receiver terminal for which the data is intended. The gateway server simply effects digital-to-analog conversion from voice coded data to radio signals, the conversion being the same for all the radio receiver terminals. The "push-to-talk" service described in U.S. 2004/0032843 in no way adapts itself to suit the capacities of the receiver terminals.

Other aspects, objects and advantages of the invention become apparent on reading the description of one embodiment of the invention.

The invention can also be better understood in the light of the drawings, in which.

Version 5 of the UMTS, which introduces the IMS (Internet Protocol Multimedia Subsystem), is described below. A major evolution of that architecture results from the correlation between the data transport packet switching domain of a UMTS network 7 (FIG. 1) and an IP (Internet Protocol) network 8 incorporating transport control mechanisms.

Figure 1:
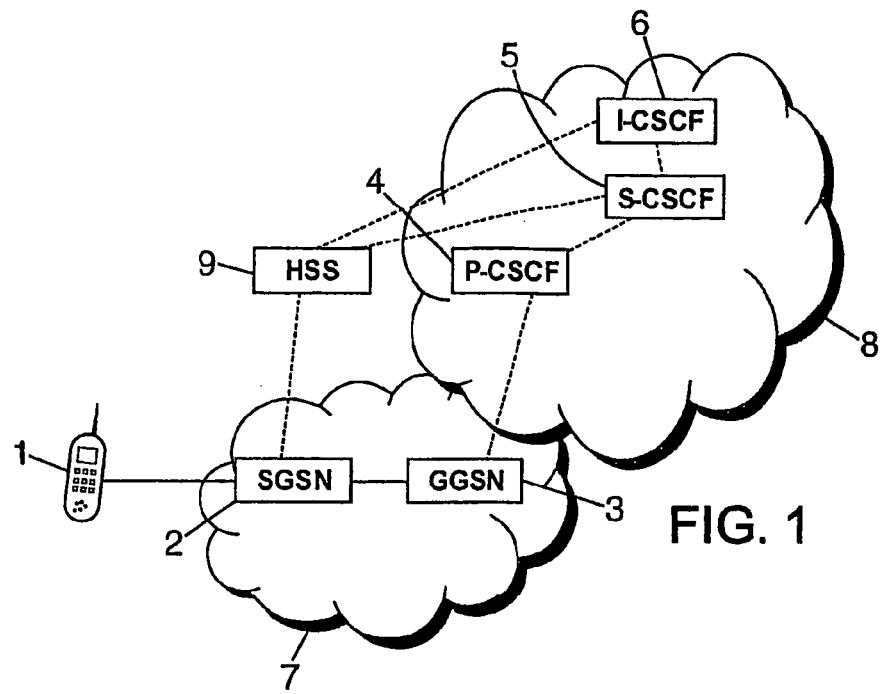
FIG. 1 represents the architecture of an IMS multimedia IP network as standardized for version 5 of the UMTS.

The architecture of an IMS network as standardized for version 5 of the UMTS is described next with reference to FIG. 1. The core of the IP architecture for version 5 of the UMTS, called the IMS (Internet Protocol Multimedia Subsystem), consists of CSCF (Call State Control Function) equipments 4, 5 and 6 that control multimedia sessions in the IMS network and interact with other entities of the IMS network such as application servers. There are several types of CSCF equipments in the IMS network architecture:

P-CSCF (proxy-CSCF) modules 4, which are the first points of contact for the terminals in the IMS; these entities have a PDF-type resource control function, S-CSCF (serving-CSCF) modules 5, which control the sessions of a terminal throughout the period for which the terminal is registered in the IMS; and I-CSCF (interrogating-CSCF) modules 6, which are entry points to a network 8 of this kind for multimedia sessions between a user of this network and a user of another network of the same type.

The network element 9 or HSS (Home Subscriber Server) is introduced in version 5 of the UMTS in the form of the HLR (Home Location Register), also having functions relating to the multimedia IP domain. In other words, the network element HSS also contains a database of multimedia IP domain users. The S-CSCF modules 5 are interfaced to the HSS network elements 9.

The terminals 1, the CSCF equipments 4, 5 and 6 and the application servers use the Session Initiation Protocol (SIP). In this kind of architecture, an SIP session is used to set up packet transport sessions for multimedia services. The nodes of the multimedia IP domain 8 and the UMTS packet switching domain 7 are linked so that there is a correlation between the transport layer that supplies the resources and the application layer that controls the resources provided to users by the transport layer. The architecture of an IMS network therefore offers resource control. The standard for version 5 of the UMTS standardizes the setting up of a communications session in this kind of architecture, in particular between a terminal 1 of the UMTS network 7 registered in the IMS 8 and another terminal or an application server registered in an IP network.

A terminal therefore uses the SIP to set up a session in the IMS domain. It first registers itself in the IMS domain in order, among other things, to determine the P-CSCF module and the S-CSCF module managing the session. When the terminal has been registered in the IMS domain, it can initiate a session with one or more other terminals using the 'INVITE' procedure, as shown in FIG. 2.

Figure 2:
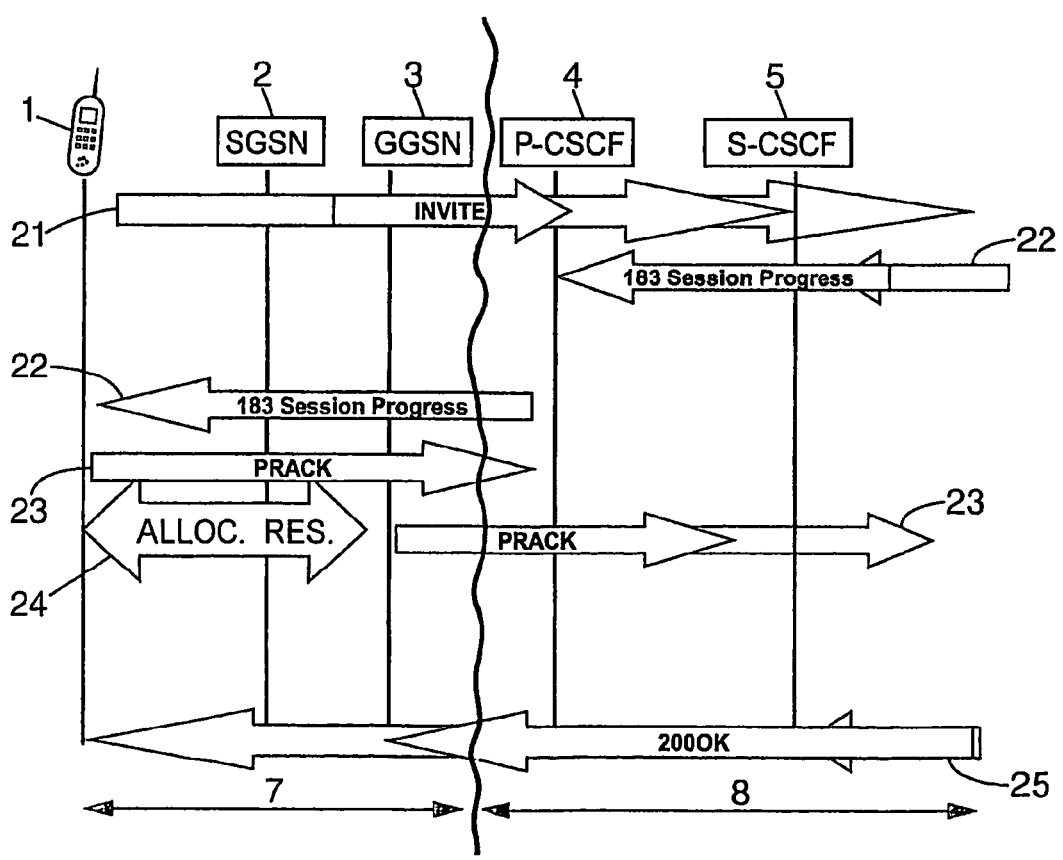
FIG. 2 represents an exchange of messages for setting up a session in an architecture like that shown in FIG. 1.

FIG. 2 shows the exchange of messages between the various entities of the UMTS network and the Internet Protocol network. A terminal 1 which is a user of the packet switching network 7 and the IMS network registers in the network 8. This procedure, well known to the person skilled in the art, is not described here. The present description assumes that the terminal 1 is already registered on the network 8. The terminal is therefore authorized to set up a data transmission session and initiates the setting up of a session by sending an SIP 'INVITE' message 21 to the SGSN network element 2, which forwards the message to the GGSN network element 3, which forwards it to the P-CSCF network element 4, which forwards the message to the S-CSCF network element 5, which finally forwards it to a recipient, which may be an application server or a terminal. The message 21 contains parameters requested by the terminal 1 that define certain aspects of the session that is being set up. The parameters may indicate the type of media to be transmitted during the session (for example video, audio, etc.) and may also indicate the ports at which the terminal wishes to receive the data and the codec that will be used, which can be selected according to the media type or other parameters characterizing the session. These parameters are conventionally sent in the SIP 'INVITE' message 21 using the SDP.

When the recipient receives the 'INVITE' message, the parameters requested by the terminal 1 and the capacities of the recipient are compared. From this comparison, the recipient deduces negotiated parameters which it then sends to the terminal 1 in an SIP '183 session progress' message 22 sent in response to the message 21. The message 22 is sent to the terminal 1 via the successive network elements S-CSCF, P-CSCF, GGSN and finally SGSN.

In response to the SIP '183 session progress' message 22 the terminal 1 sends an SIP 'PRACK' message 23 that contains parameters common to the recipient and the initiator terminal 1.

The terminal 1 then requests the GGSN network element 3 to reserve transmission resources 24 required to transport data in the packet switching UMTS network for the session that is being set up.

Finally, on receiving the SIP 'PRACK' message 23, the data transmission session is set up. An SIP '200 OK' message 25 informs the terminal 1 of this.

In a preferred embodiment of the present invention, the architecture of a "push-to-talk" service in a UMTS network is based on the IMS architecture whose principles are set put above. That architecture is described below with reference to FIG. 3.

Figure 3:
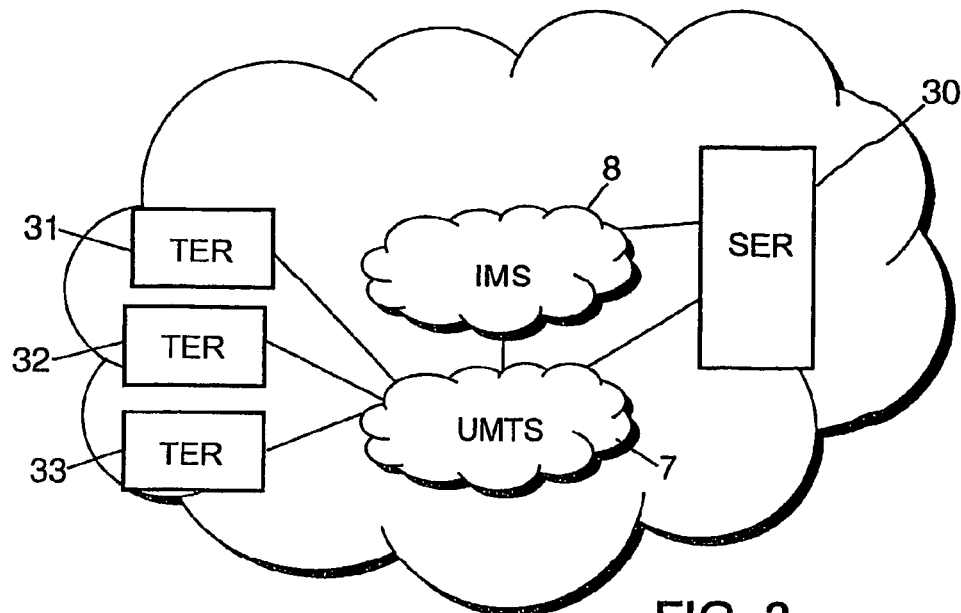
FIG. 3 represents a network architecture for managing a "push-to-talk" session.

In FIG. 3, first, second and third terminals 31, 32 and 33 are connected to the packet switching UMTS network 7. A "push-to-talk" server 30 is introduced into the IMS domain.

An embodiment of the present invention therefore introduces into an architecture as described above a "push-to-talk" server being able to set up "push-to-talk" session and to manage and adapt transmission of coded data received from a terminal that is authorized to send to each receiver terminal as a function of the type of coding used for data received from the sender terminal and the respective coding and decoding capacities of the receiver terminals.

To provide this kind of data transmission adaptation; the server preferably knows the coding and decoding capacities of each of the terminals logged onto the session. To this end, the server stores the respective coding and decoding capacities of the terminals logged onto the session during exchanges of messages between the terminals when setting up the session, as described in detail below. The invention nevertheless encompasses any other way for the server to store the respective coding and decoding capacities of the terminals logged onto the session.

In an embodiment of the invention, the "push-to-talk" server advantageously incorporates functions enabling it, for each of the receiver terminals, to process a packet received in order to extract the payload data from it (removing the transport header) in order to determine if the received data is coded in a way that the respective receiver terminal is able to decode. If the "push-to-talk" server detects that a receiver terminal is not able to decode data as coded by the sender, it adapts the coding of the transmitted data by recoding it so that the receiver terminal is able to decode it.

In a preferred embodiment of the invention, the push-to-talk server advantageously includes a coder/decoder adapted to effect adaptive coding of the received data in accordance with the capacities of the terminals involved in the "push-to-talk" session.

Following this adaptive coding, the "push-to-talk" server adds the transport header for each recoded data packet before forwarding that data to the terminal for which the adaptive coding has been effected.

In an embodiment of the invention, the codecs are AMR (adaptive multirate) codecs. An AMR codec conventionally operates in eight different modes defining different bit rates. The initiator terminal therefore indicates the AMR codec modes that it supports in the requested parameters. AMR codecs are referred to here by way of illustration, the invention naturally encompassing other types of codec.

In an embodiment of the invention, an SIP "push-to-talk" session is set up and sending is authorized in accordance with the Real Time Control Protocol (RTCP).

Figure 4:
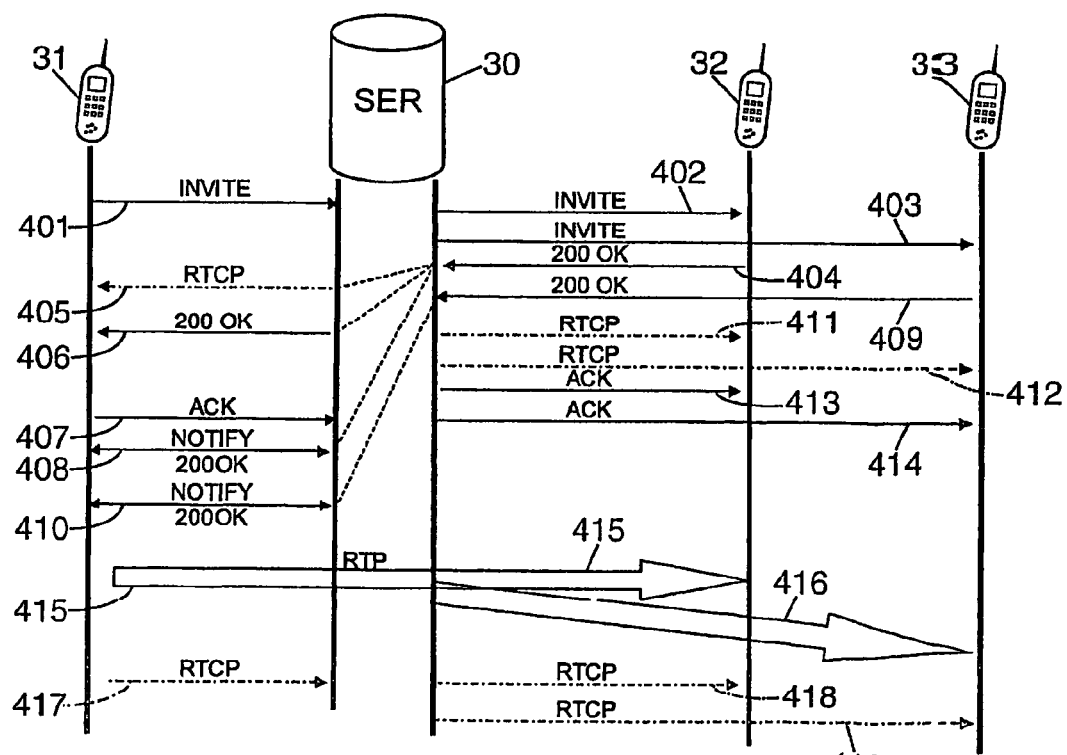
FIG. 4 represents an exchange of messages between the various network elements for managing a "push-to-talk" data transmission session conforming to one embodiment of the invention.

FIG. 4 shows an embodiment of the present invention of this kind.

In FIG. 4, the terminal 31 initiates the "push-to-talk" session by sending to the "push-to-talk" server 30 an SIP 'INVITE' message 401 that preferably contains parameters of the "push-to-talk" service, for example the coding and decoding capacities of the initiator terminal (i.e. the codecs that the initiator terminal can use). These parameters are preferably sent using the SDP.

The "push-to-talk" server 30 sends this SIP 'INVITE' message to the terminals 32, 33 participating in the "push-to-talk" session in messages 402 and 403.

The server preferably stores the coding and decoding capacities of the initiator terminal contained in the 'INVITE' message 401.

The participating terminals 32, 33 respond to the push-to-talk server 30 with respective SIP '200 OK' messages 404 and 409 that preferably also contain a description of the media types and coding and decoding types supported by the respective participating terminals 32 and 33. This kind of description can be sent using the SDP.

On receiving an SIP '200 OK' message, the server preferably stores the coding and decoding capacities of the terminal.

Moreover, as soon as the first SIP '200 OK' message is received, which here is the '200 OK' message 404 sent by the participating terminal 32, the server 30 sends the initiator terminal an RTCP message 405 to authorize it to send. The server then sends an SIP '200 OK' message 406 to the initiator terminal 31 giving it the coding and decoding capacities of the first participating terminal that has responded.

The server then sends an RTCP message 411 to the participating terminal 32 that has responded, telling it that it is authorized to send.

The other participating terminal 33 responds to the SIP 'INVITE' message by sending the "push-to-talk" server 30 an SIP '200 OK' message 409 that contains its own coding and decoding capacities. The "push-to-talk"server 30 stores the coding and decoding capacities of the participating terminal 33 and sends it an RTCP message 412.

The terminal initiating the "push-to-talk" session then receives from the "push-to-talk" server 30 notification messages 408 and 410 informing it of the connection of the participating terminals 32, 33.

When the initiator terminal that has been authorized to send codes the data to be sent, it selects an initial coding type from the coding types that it shares with the participating terminal 32 that responded first to the SIP 'INVITE' message and that were indicated in the SIP '200 OK' response message 406 received from the push-to-talk server 30. The initiator terminal then sends the coded data 415.

The data is preferably sent using the Real Time Protocol (RTP).

The server receives and processes the coded data 415. It checks the compatibility of the respective capacities of the receiver terminals against the initial coding type used by the sender terminal. This check is based on stored information relating to the coding and decoding capacities of the connected terminals.

By means of this check, the server detects that the capacities of the receiver terminal 32 are compatible with the initial coding type used by the sender terminal 31. The server therefore forwards the coded data 415 as received, i.e. coded using the initial coding type.

In contrast, if the server detects an incompatibility between the coding and decoding capacities of the receiver terminal 33 and the initial coding type used by the sender terminal 31, it proceeds as follows for each data packet received:

- it extracts the payload data contained in the packet (i.e. it removes the transport header generally corresponding to the following protocol layers: RTP, then UDP (User Datagram Protocol), then IP (Internet Protocol));
- it selects a coding type compatible with the stored capacities of the terminal 33;
- it codes the payload data from the packet using the selected coding type;
- it adds the transport header;
- it forwards the packet to the receiver terminal 33.

The line 416 represents the sending of coded data to the participating terminal 33 using the coding type selected by the server.

Note that in a prior art "push-to-talk" service, the server does not effect any adaptation of the coding type and data coded using the initial coding type received from the terminal 31 one therefore forwarded to the participating terminals 32 and 33 coded using the initial coding type. Consequently, the participating terminal 33 is not able to decode it.

When the sending initiator terminal has finished sending, it sends an RTCP 'release' message 417 to indicate that it has finished sending. On receiving this message, the "push-to-talk" server sends an RTCP 'idle' message to each participating terminal 418, 419 to inform them that they can request authorization to send.

Accordingly, when a participating terminal that is authorized to send sends data to the other terminals logged onto the session via the server, the server proceeds to adapt the sent data coding type in the manner described above.

In an embodiment of the present invention, if a new terminal wishes to participate in an established "push-to-talk" session, it sends the "push-to-talk" server an SIP 'INVITE' message containing the coding type(s) that it support(s). Consequently, the server stores the coding and decoding capacities of the new terminal that has been connected in order to send it coded data in the manner described above.

An embodiment of the invention therefore has the advantage of offering a "push-to-talk" service that is simple, very flexible and highly adaptive. It enables terminals to communicate even if they have incompatible coding and decoding capacities, without having to introduce functions at the terminal level.

What is more, an embodiment of the invention is therefore easy to use in a network conforming to versions 99, 4, 5, 6 et seq of the UMTS.

The invention claimed is:

1. A method of managing a walkie-talkie ("push-to-talk") mode session between a plurality of terminals having respective data coding and decoding capacities, the method comprising:
   connecting the plurality of terminals in the session via a walkie-talkie mode session management server and at least one telecommunications network;
   establishing a multimedia session between a first terminal and one or more other terminals of the plurality of terminals through message exchanges based on a signaling protocol; and
   during the established multimedia session:
      sending multimedia data coded using an initial coding type from a sender terminal to a plurality of receiver terminals connected via the server, the initial coding type representing a codec used by the sender terminal to code the multimedia data;
      receiving, at the server, the multimedia data coded using the initial coding type, upon reception of the multimedia data coded according to the initial coding type;
      checking, at the server and using the received data, the compatibility of the respective capacities of the receiver terminals with the initial coding type of the received coded multimedia data;
      under the condition that an incompatibility between the initial coding type of the received coded multimedia data and the capacities of any of the receiver terminals is detected by the server, adapting, at the server and for each incompatible receiver terminal, the coding of the received multimedia data from the initial coding type to a coding type compatible with the capacities of said incompatible receiver terminal before forwarding, by the server, the adapted multimedia data to their respective incompatible receiver terminal, so that each incompatible receiver terminal is therefore able to decode the multimedia data; and
      forwarding, by the server, the received multimedia data coded using the initial code type without adaptation, to any receiver terminal that has capacities compatible with the initial coding type;
   wherein said adapting comprises, at the server side:
      extracting, from the received multimedia data, payload data coded using the initial coding type;
      determining and selecting one coding type that is compatible with the capacities of the receiver terminal; and
      coding the payload data having the initial coding type into payload data that has the selected coding type,
      wherein the payload data is coded useful multimedia data of a data packet that is different from a header of the multimedia data packet.

2. The method according to claim 1, wherein the server stores the coding and decoding capacities of the terminals logged onto the session.

3. The method according to claim 2, wherein, the session between the terminals is established through the intermediary of the server by exchange of predefined messages using a particular signaling protocol, and terminals logging onto the session send their coding and decoding capacities to the server in the messages exchanged with the server while establishing the session.

4. The method according to claim 3, further comprising when the session has been established, sending the server a predefined message if a new terminal wishes to participate in the session, using the signaling protocol in order to log onto the session, the message containing coding and decoding capacities of the new terminal.

5. The method according to claim 3, wherein said particular signaling protocol is the Session Initiation Protocol (SIP), and establishing of the session with at least one participating terminal at the request of an initiator terminal comprises:
   sending the server an SIP 'INVITE' message from the initiator terminal containing the coding and decoding capacities of the initiator terminal;
   on receiving the 'INVITE' message from the initiator terminal, sending the participating terminal an SIP 'INVITE' message from the server;
   in response to the 'INVITE' message from the server, sending the server an SIP '200 OK' message from the participating terminal containing its coding and decoding capacities of the participating terminal.

6. The method according to claim 5, further comprising, sending the server an 'INVITE' message from a new terminal containing its coding and decoding capacities under the condition that the new terminal wishes to participate in a session that has been established.

7. The method according to claim 1, wherein the coding types supported by the terminals logged onto the session correspond to modes of an adaptive multirate (AMR) codec.

8. The method according to claim 1, wherein the respective coding and decoding capacities of the terminals logged onto the session are sent to the server using a Session Description Protocol (SDP).

9. A service for managing a walkie-talkie ("push-to-talk") mode session, supported by at least one telecommunications network and intended to be implemented by a plurality of terminals logged onto the same session, the service consisting, in operation, in executing the steps of the method according to claim 1.

10. A server for managing a walkie-talkie ("push-to-talk") mode session, comprising means for implementing the method according to claim 1.

11. A system for managing a walkie-talkie ("push-to-talk") mode session, comprising means for implementing the method according to claim 1.

12. The method according to claim 1, wherein the server transcodes the received multimedia data into a coding type that is compatible with the capacities of the receiver terminal.

13. The method according to claim 1, wherein the server that receives the coded multimedia data, checks the compatibility of the coded multimedia data and adapts the coded multimedia data, under the condition of incompatibility, the coding of the received multimedia data is a server that previously receives a session-initializing message from one of the terminals and sends the message to the other terminals in order to establish the session.

14. The method according to claim 1, wherein, under the condition that a compatibility between the initial coding type of the received coded multimedia data and the capacities of at least one of the receiver terminals is detected by the server, forwarding, by the server, the coded multimedia data as received.

15. The method according to claim 1, wherein the multimedia data is voice, image or video data.

16. The method according to claim 1, further comprising:
   sending, by a new terminal wishing to participate in the multimedia session, a message to join the multimedia session; and
   sending multimedia data coded using an initial coding type from the new terminal to the plurality of receiver terminals connected via the server.

\* \* \* \* \*